United States Patent

Nakazawa et al.

Patent Number: 5,892,528
Date of Patent: Apr. 6, 1999

[54] WATER-SOLUBLE INK FOR INK JET TYPE RECORDING AND INK JET TYPE RECORDING APPARATUS USING SAME

[75] Inventors: Chiyoshige Nakazawa; Kenichi Kato; Katsuko Aoki; Youichi Kubomura; Hiroshi Mukai, all of Nagano, Japan

[73] Assignee: Seiko Epson Corporation, Tokyo, Japan

[21] Appl. No.: 451,146

[22] Filed: May 26, 1995

[30] Foreign Application Priority Data

May 27, 1994 [JP] Japan ................................. 6-114817

[51] Int. Cl.⁶ ........................... B41J 2/01; C09D 11/02
[52] U.S. Cl. ......................... 347/100; 106/31.13
[58] Field of Search ................. 347/100; 106/20 D, 106/31.13

[56] References Cited

U.S. PATENT DOCUMENTS

| 4,409,040 | 10/1983 | Tabayashi | 106/20 D |
|---|---|---|---|
| 5,183,502 | 2/1993 | Meichsïer et al. | 347/100 |
| 5,196,057 | 3/1993 | Escano et al. | 106/20 D |
| 5,395,434 | 3/1995 | Tochihara et al. | 347/100 |
| 5,622,550 | 4/1997 | Konishi et al. | 347/100 |

FOREIGN PATENT DOCUMENTS

| 59068379 | 4/1984 | Japan . |
|---|---|---|
| 63314285 | 12/1988 | Japan . |
| A2255774 | 10/1990 | Japan . |
| A625573 | 2/1994 | Japan . |

*Primary Examiner*—Valerie Lund
*Attorney, Agent, or Firm*—Sughrue, Mion, Zinn, Macpeak & Seas, PLLC

[57] ABSTRACT

A water-soluble ink for ink jet type recording is disclosed, which comprises water, a water-soluble dye, a wetting agent and a surfactant, wherein said surfactant is a mixture comprising a compound represented by the following formula (A):

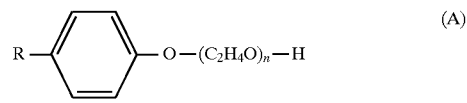

wherein R represents a halogen atom or an alkyl group; and n represents a positive integer, and a compound represented by the following formula (B):

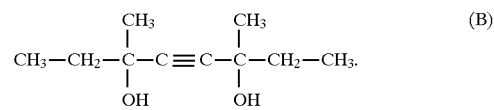

The water-soluble ink for ink jet type recording may provide a high quality printed image having a large printed dot diameter on various kinds of papers such as ordinary paper and poor quality paper with a reduced amount of ink.

10 Claims, 3 Drawing Sheets

WATER-SOLUBLE INK FOR INK JET TYPE RECORDING AND INK JET TYPE RECORDING APPARATUS USING SAME

FIELD OF THE INVENTION

The present invention relates to a water-soluble ink for ink jet type recording for use in terminal printer for personal computer, printer for electronic calculator or printer for register and an ink jet type recording apparatus using the water-soluble ink.

BACKGROUND OF THE INVENTION

Examples of a water-soluble ink for use in a printer of an ink jet recording type that ejects ink droplets through fine nozzles in response to an image signal while controlling the flying route of the ink droplets which are then attached to the surface of paper such as ordinary paper to provide recording include those disclosed in JP-A-2-255774 (The term "JP-A" as used herein means an "unexamined published Japanese patent application") and JP-A-6-25573 (corresponding to U.S. Pat. No. 5,395,434).

The water-soluble ink for ink jet type recording as disclosed in JP-A-2-255774 comprises water, a water-soluble dye, a drying inhibitor and a penetrant, wherein the penetrant comprises a compound represented by the following formula:

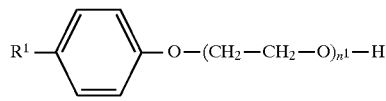

wherein $R^1$ represents hydrogen atom, methyl group, methoxy group, chlorine atom or bromine atom; and $n^1$ represents an integer 1 to 5 (hereinafter referred to as compound (1))

and a butyl alcohol-ethylene oxide adduct having an ethylene oxide addition mole number of 1 to 5 (hereinafter referred to as "compound (2)"), and optionally a butyl alcohol-propylene oxide adduct having an ethylene oxide addition mole number of 1 to 5 (hereinafter referred to as "compound (3)"), whereby the surface tension of the water-soluble ink is controlled within a range of from 30 to 40 dyne.

Ink obtained by mixing the foregoing various compounds may be continuously and stably ejected against a commercial copying paper in a drop-on-demand type jet printer for a prolonged period of time. She ink also can thoroughly penetrate into an ordinary paper, whereby a good print image quality can be provided.

The ink for ink jet type recording as disclosed in JP-A-6-25573 comprises a dye, water, 0.1 to 20% by weight of a compound represented by the following formula:

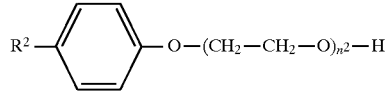

wherein $R^2$ represents an alkyl group, and $n^2$ represents an integer (hereinafter referred to as "compound (4)"), (hereinafter referred to as "compound (5)"), and urea or its derivative (hereinafter referred to as "compound (6)"), whereby a uniform image free of color deviation can be provided without causing bleeding (i.e., mixing of different colors caused by unfixed ink dots when they are brought into contact with each other) even when a high speed printing is made on an ordinary paper.

The foregoing conventional aqueous ink for ink jet type recording comprises compound (1), and compound (2), and optionally compound (3) as a penetrant. The aqueous ink causes no clogging in the printer nozzle and thus can be stably ejected to provide a high printing quality. Further, the aqueous ink comprising compounds (4), (5) and (6) are said to exhibit an improved wettability with respect to paper and thus causes less bleeding. However, these conventional aqueous inks are disadvantageous in that they cause feathering (i.e., oozing out of ink along paper fibers) and thus cannot provide a printed image with clear out-line when used with poor quality paper having a low fiber density than ordinary paper (e.g., regenerated papers, paper for use in a register printer).

Further, since the fibers (chief material mainly composed of cellulose) and a sizing agent (agent for smoothening the paper surface, mainly composed of starch or rosin) constituting the paper are oily materials, the foregoing aqueous inks, which have a low lipophilicity, are disadvantageous in that ink I attached to paper P hardly penetrate into paper P and thus gives a small diameter of printed dot d1 as shown in FIG. 1A, making it impossible to provide a sharp printed image. When the lipophilicity of the ink is increased to solve these difficulties, the penetrant and other components are rendered insoluble in water or, if soluble, the resulting ink becomes foamable, whereby it is impossible to provide stable ejection (continuous ejection of ink droplets in a constant amount at a constant rate).

On the other hand, a relatively small-sized wire dot printer, for example, is equipped with a printing head weighing about 60 g. Therefore, it is possible to apply inexpensive and small-sized printer driving devices into an ink jet type printer as it is if the weight of the ink unit (excluding the weight of the recording head and the cartridge) is not more than about 50 g, as one possibility. Further, in view of the life of the ink ribbon in the existing wire dot printer, it is desirable that 10 million letters can be printed with an ink unit weighing 50 g or less to make the ink jet type printer applicable to various applications of use. However, since the conventional aqueous ink must be consumed in a large amount to make printed letters visible, the ink unit tends to enlarge to a weight of 50 g or more, which renders an ink jet type printer to be large. On the other hand, if the amount of the ink is reduced to a weight of 50 g or less, it causes frequent replacement of the ink jet cartridge, whereby its facility in use deteriorates.

SUMMARY OF THE INVENTION

It is therefore an object of the present invention to provide a water-soluble ink for ink jet type recording which is able to provide a high quality printed image with a large printed dot diameter in a small consumed amount of ink on ordinary paper as well as various papers such as poor quality paper.

It is another object of the present invention to provide an ink jet type recording apparatus using such a water-soluble ink.

These and other objects of the present invention will become more apparent from the following detailed description and examples.

The water-soluble ink for ink jet type recording of the present invention comprises water, a water-soluble dye, a wetting agent and a surfactant, wherein said surfactant is a mixture comprising a compound represented by the following formula (A):

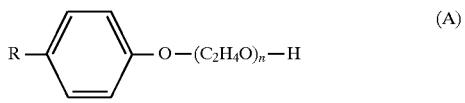

(A)

wherein R represents a halogen atom or an alkyl group; and n represents a positive number, and a compound represented by the following formula (B):

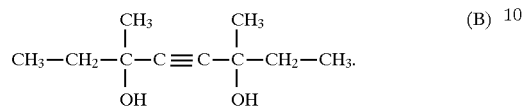

(B)

The water-soluble ink for ink jet type recording of the present invention may further comprise a compound represented by the following formula (C):

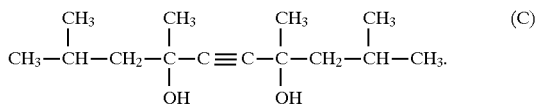

(C)

BRIEF DESCRIPTION OF THE DRAWINGS

By way of example and to make the description more clear, reference is made to the accompanying drawings in which.

DETAILED DESCRIPTION OF THE INVENTION

Figure 1A:
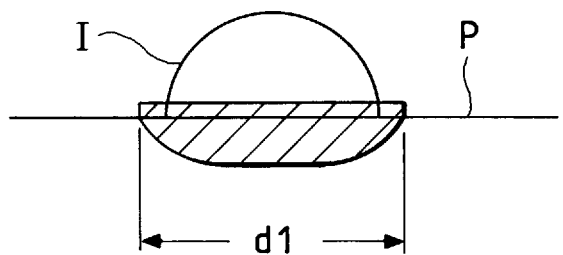
FIG. 1A is a diagram illustrating the action of a conventional water-soluble ink for ink jet type recording.

Examples of the halogen atom represented by R in formula (A) include fluorine atom, chlorine atom, bromine atom, iodine atom and astatine atom. Among them, fluorine atom, chlorine atom, bromine atom and iodine atom are preferred and chlorine atom is more preferred.

Examples of the alkyl group represented by R in formula (A) include those having 4 to 20 carbon atoms, such as hexyl group, heptyl group, octyl group, nonyl group, decyl group, undecyl group, dodecyl group, tridecyl group, and tetradecyl group. Among them, octyl group and nonyl group are preferred.

In formula (A), n represents the addition mole number of the oxyethylene group. Although it may range from 2 to 100, it is preferably within the range of from 10 to 20 in view of the storage stability and the penetrating power into paper of the water-soluble ink.

Specific and preferred examples of the compound of formula (A) include polyoxyethylene octylphenylether and polyoxyethylene nonylphenylether.

The compound of formula (A) may be present in the water-soluble ink for ink jet type recording of the present invention in an amount of 10% by weight or less based on the weight of the water-soluble ink. However, in view of the penetrating power into paper and the solubility in water of the ink, the amount is preferably within a range of from 0.01 to 1% by weight, more preferably from 0.1 to 0.5% by weight.

The compound of formula (B) may be present in the water-soluble ink for ink jet type recording of the present invention in an amount of 10% by weight or less based on the water-soluble ink. However, in view of the diameter of the printed dot and the solubility in water of the ink, the amount is preferably within a range of from 1 to 5% by weight.

The amount of the compound of formula (C) may be present in the water-soluble ink for ink jet type recording of the present invention in an amount of 1% by weight or less based on the weight of the water-soluble ink. However, in view of the solubility in water of the ink, it is preferably within a range of from 0.01 to 0.3% by weight, more preferably from 0.1 to 0.3% by weight.

The water-soluble ink for ink jet type recording of the present invention may further comprise a nitrogen-containing heterocyclic compound. Preferred examples of the nitrogen-containing heterocyclic compound include 1,3-dimethyl-2-imidazolidinone, N-methyl-2-pyrrolidone, and 2-pyrrolidone. The nitrogen-containing heterocyclic compound is preferably contained in an amount of 20 times by weight or more of the sum of the contents of the compound of formula (A) and the compound represented by formula (C).

The water-soluble dye to be used in the present invention is not particularly limited and one conventionally used in the art may be used so long as it is water-soluble. Specific examples of the water-soluble dyes are disclosed, for example, in JP-A-2-255774 and U.S. Pat. No. 5,180,425, hereby incorporated by reference.

In general, the water-soluble dye may be present in the water-soluble ink for ink jet type recording of the present invention in an amount of from 0.1 to 10% by weight, preferably from 1 to 5% by weight, more preferably from 2 to 4% by weight, based on the weight of the water-soluble ink.

The wetting agent to be used in the present invention is not particularly limited and may be selected from conventionally used low vapor pressure water-soluble organic solvents. Specific examples of the wetting agent include those disclosed, for example, in JP-A-2-255774. Also, those taught in U.S. Pat. No. 5,180,425, hereby incorporated by reference, as water-soluble organic solvents (5) and (6) for the aqueous carrier medium may be used in the present invention as the wetting agent.

In general, the wetting agent may be present in the water-soluble ink for ink jet type recording of the present invention in an amount of from 1 to 70% by weight, preferably from 2 to 40% by weight, more preferably from 10 to 25% by weight, based on the weight of the water-soluble ink.

The water-soluble ink for ink jet type recording of the present invention may be prepared by mixing the above-mentioned ingredients in a conventional manner.

The ink jet type recording apparatus of the present invention employs the foregoing water-soluble ink for ink jet type recording.

The water-soluble ink for ink jet type recording of the present invention comprises a surfactant comprising the compound of formula (A) and the compound of formula (B) in predetermined amounts to have an improved affinity for the fibers or sizing agent constituting the paper, whereby facilitating the penetration thereof into paper.

Thus, the water-soluble ink for ink jet type recording of the present invention is able to penetrate uniformly into a poor quality paper and thus less causes feathering that deteriorates the printed image quality. Further, since the water-soluble ink for ink jet type recording of the present invention has a strong penetrating power, large dots may be printed on various kinds of papers even with ink droplets of a relatively small amount, whereby the ink consumption may be reduced and hence an efficient printing may be accomplished.

The water-soluble ink for ink jet type recording of the present invention may further comprise the compound of formula (C) to form a larger printed dot. Further, the water-soluble ink for ink jet type recording of the present invention may also comprise the nitrogen-containing heterocyclic compound to inhibit the deterioration of storage stability.

The water-soluble ink for ink jet type recording of the present invention wherein the addition mole number n in the compound of formula (A) is from 10 to 20 and the compounds of formulae (A), (B) and (C) are respectively contained in amounts of from 0.01 to 1% by weight, from 1 to 5% by weight and from 0.01 to 0.3% by weight makes possible to form a large dot on various kinds of paper and to print 10 million letters with 50 g or less of the ink amount.

The present invention will be further described in the following examples and comparative examples, but the present invention should not be construed as being limited thereto. The term "%" as used hereinafter is meant to indicate "% by weight" unless otherwise indicated. The compound (A) represents a poly(oxyethylene) phenyl ether represented by formula (A). The compound (B) represents an acetylene type diol surfactant represented by formula (B). The compound (C) represents an acetylene type diol surfactant represented by formula (C). DMI represents 1,3-dimethyl-2-imidazolidinone, while 2-P represents 2-pyrrolidone.

EXAMPLES 1–9 AND COMPARATIVE EXAMPLES 1–3

Table 1 shows the formulation of inks of Examples 1 to 9 and Comparative Examples 1 to 3.

80° C. for 1 hour. Each of the resulting solutions was filtered through a 0.8-$\mu$m membrane filter to prepare water-soluble inks for ink jet type recording of Examples 1 to 9 and Comparative Examples 1 to 3. These inks were then evaluated for the following properties.

(1) Surface tension:
The surface tension of the ink was measured by means of a Wilhelmy's tensiometer.

Figure 2:
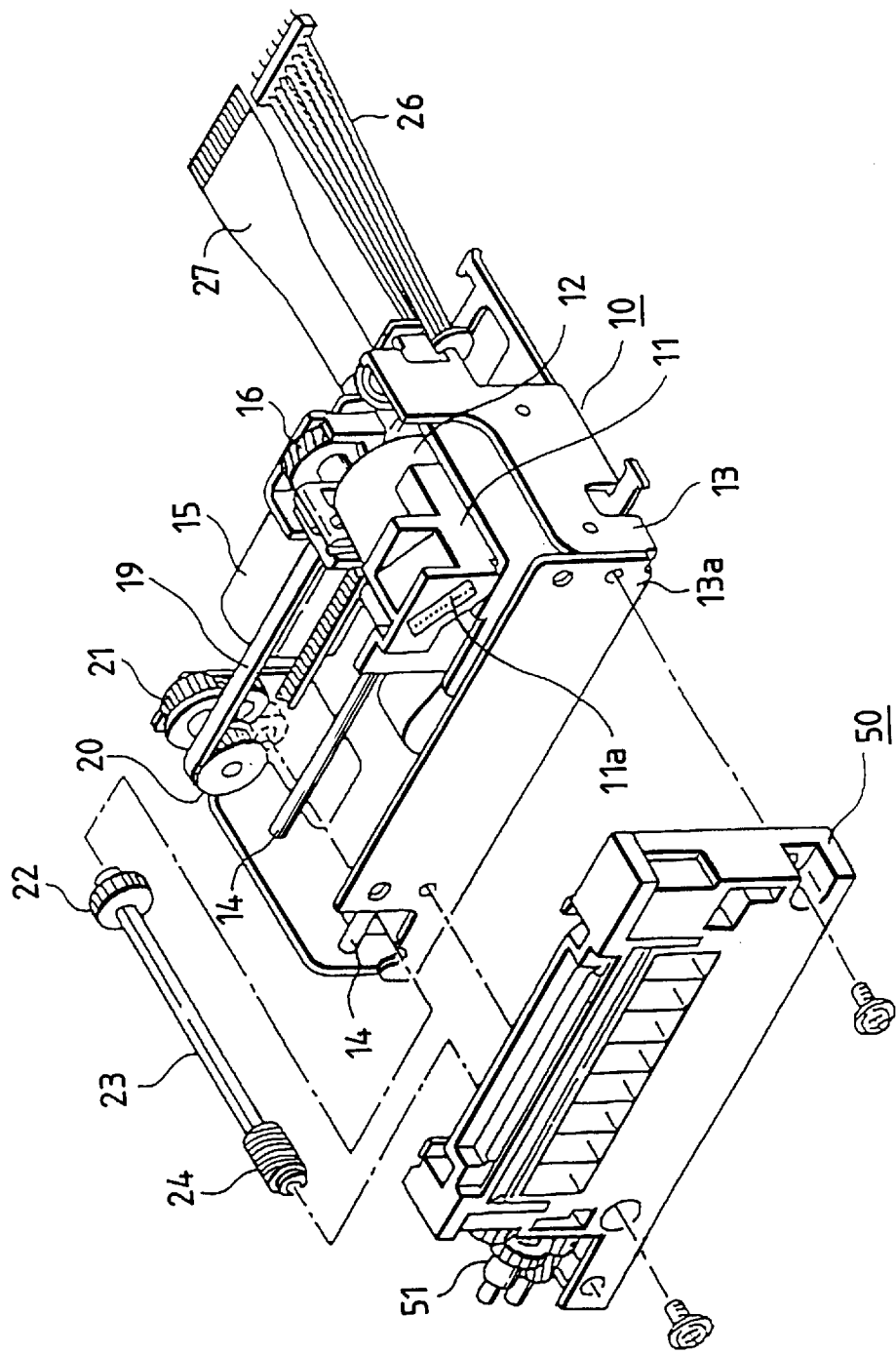
FIG. 2 is an exploded view illustrating an ink jet type printer according to an embodiment of the present invention.
Figure 3:
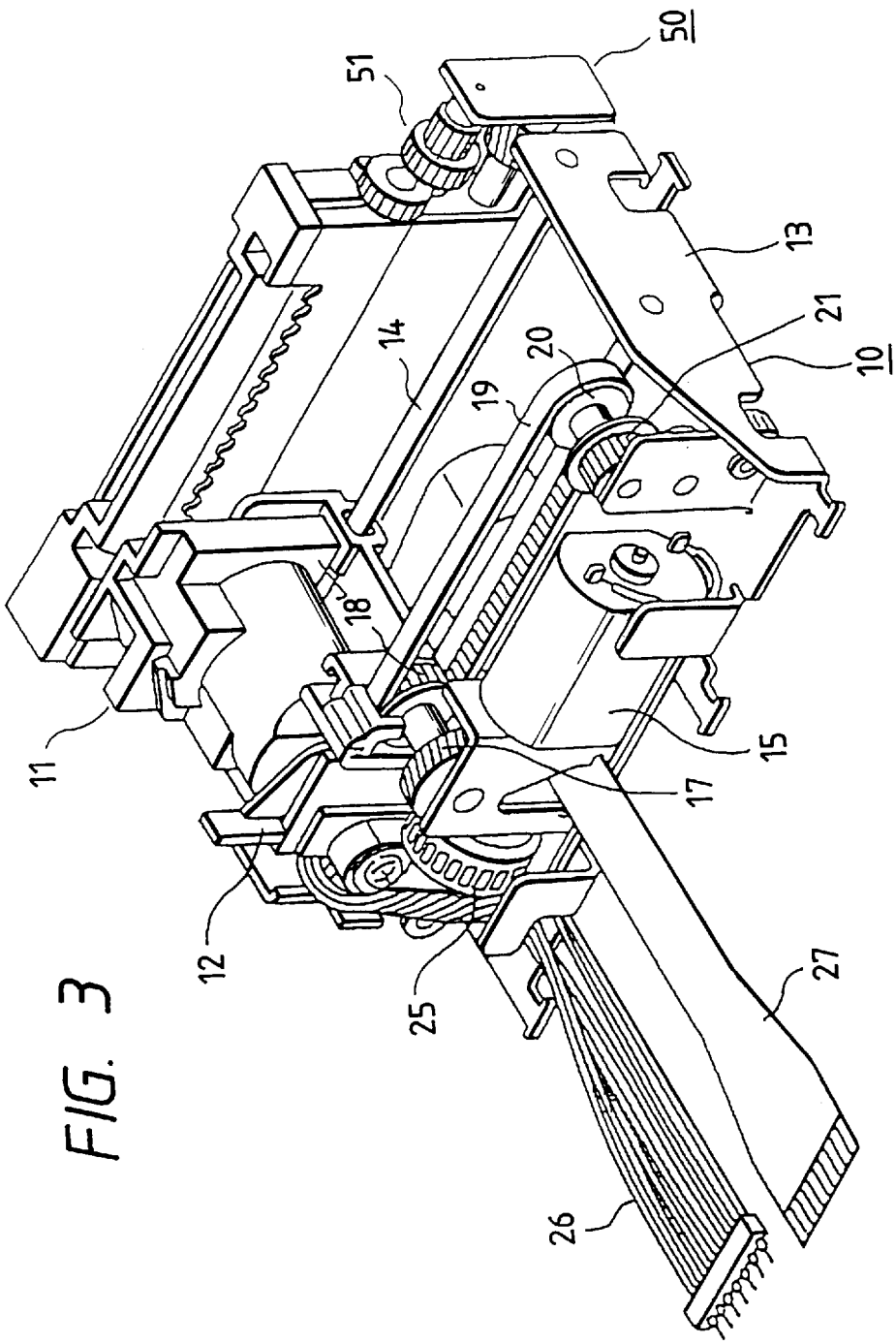
FIG. 3 is a perspective view of the ink jet type printer as viewed from the motor side.

(2) Printed dot diameter:
Using an ink jet type printer (the structure and operation thereof are illustrated in FIGS. 2 and 3) arranged such that the amount of ink to be ejected through a nozzle per ejection is 0.1 $\mu$g/dot and the nozzle pitch (distance between adjacent nozzles) corresponds to a resolution of 90 dot/inch, printing was made on a commercially available ordinary paper (e.g., PPC paper available from Fuji Xerox Co., Ltd.) and a register paper (e.g., 45 kg register paper available from Oji Paper Co., Ltd.). The diameter of dots printed on these papers were then measured under a metallographic microscope. For the determination of the dot diameter, the length and width of the dot were measured and these values were simply averaged.

(3) Amount of ink for required dot diameter:
Printing was made on the ordinary paper and register paper while varying the ink ejection amount to make a graph showing the relationship between the ink ejection amount and the diameter of printed dot. From this graph, the ink ejection amount that realizes a printed dot diameter (0.28 mm$\phi$) suitable for a printer providing a low resolution printing output and the ejection amount of ink that realizes a printed dot diameter (0.13 mm$\phi$) suitable for a printer providing a middle resolution printing output were read out.

The print density is determined by the resolution (dot density), the size and density (OD value) of the printed dot. The optimum dot diameter is from 0.28 to 0.4 mm$\phi$ for a low resolution (90 dot/inch), from 0.13 to 0.18 mm$\phi$ for a middle resolution (200 dot/inch) and from 0.06 to 0.09 mm$\phi$ for a high resolution (400 dot/inch).

TABLE 1

| Example No. | Dye (%) | Wetting Agent (%) | Surfactant Compound (A) (%) | Compound (A1) (%) | $R^1$ | n | Compound (B) (%) | Compound (C) (%) | Nitrogen-containing Compound DMI (%) | 2-P (%) | Deionized Water (%) |
|---|---|---|---|---|---|---|---|---|---|---|---|
| Example |
| 1 | 3.5 | 10.0 | 0.03 | | Octyl | 17 | 3.0 | 0.14 | | 10.0 | 73.33 |
| 2 | 3.0 | 11.0 | 0.05 | | Chlorine | 18 | 2.0 | | | | 83.95 |
| 3 | 3.5 | 20.0 | 0.30 | | Chlorine | 18 | 4.0 | | | | 72.20 |
| 4 | 3.5 | 15.0 | 0.02 | | Octyl | 18 | 2.0 | 0.07 | 5.0 | | 74.41 |
| 5 | 3.0 | 15.0 | 0.10 | | Octyl | 13 | 4.5 | 0.20 | | | 77.20 |
| 6 | 3.0 | 15.0 | 0.50 | | Nonyl | 10 | 5.0 | 0.30 | | 16.0 | 60.20 |
| 7 | 3.0 | 15.0 | 1.00 | | Nonyl | 20 | 3.0 | | 10.0 | | 68.00 |
| 8 | 3.0 | 15.0 | 0.01 | | Nonyl | 13 | 2.0 | | | 3.0 | 76.99 |
| 9 | 3.0 | 15.0 | 0.01 | | Octyl | 12 | 1.0 | 0.01 | | 1.0 | 79.98 |
| Comparative Example |
| 1 | 3.0 | 15.0 | 3.00 | | Octyl | 17 | | | | | 79.00 |
| 2 | 3.0 | 10.0 | | | | | 3.0 | | | 10.0 | 74.00 |
| 3 | 3.0 | 15.0 | | 1.00 | Nonyl | 9 | 3.0 | 0.10 | | 20.0 | 57.90 |

Note:
As the dye there was used C. I. direct black 154.
As the wetting agent there was used glycerin.
Compound (A1) has the same formula as Compound (A) except that the addition mole number n thereof is 9.

The foregoing components were measured and mixed in accordance with the formulation set forth in Table 1. Each of the mixtures was stirred to dissolve at a temperature of 70 to (4) Amount of ink required for 10 million letters onto register paper:

From the results obtained in the procedure (3) above, the amount of ink required for the printing of a million letters and ten million letters on register paper (poor quality paper) were calculated.

(5) Storage Stability:

The ink was charged into a glass sample bottle and allowed to stand in a constant temperature bath set at 50° C. or 80° C. or a freezer set at −20° C. for 7 days, followed by further allowing to stand at normal temperature for 1 day. The states of the ink immediately after allowed to stand for the 7 days and after allowed to stand for the additional 1 day at normal temperature were examined and the storage stability of the ink was evaluated in accordance with the following criteria.

A: The sample had showed no separation of components after allowed to stand for the 7 days and showed no change of properties (viscosity, surface tension) after allowed to stand for the additional 1 day at normal temperature.

B: The samples had showed separation of components after allowed to stand for the 7 days but showed no change of properties (viscosity, surface tension) after allowed to stand for the additional 1 day at normal temperature.

C: The samples had showed not only separation of components but also some change of properties after allowed to stand for the additional 1 day at normal temperature.

The results of the foregoing test are set forth in Table 2.

TABLE 2

| Example No. | Surface Tension (mN/m) | Printed dot diameter (in case of ink amount of 0.1 μg/dot) | | Amount of ink for required dot diameter | | | |
|---|---|---|---|---|---|---|---|
| | | | | Low resolution | | High resolution | |
| | | Ordinary paper (mm) | Register paper (mm) | Ordinary paper (μg) | Register paper (μg) | Ordinary paper (μg) | Register paper (μg) |
| Example | | | | | | | |
| 1 | 30 | 0.21 | 0.20 | 0.35 | 0.43 | 0.04 | 0.04 |
| 2 | 34 | 0.21 | 0.18 | 0.35 | 0.58 | 0.04 | 0.05 |
| 3 | 32 | 0.20 | 0.18 | 0.41 | 0.58 | 0.04 | 0.05 |
| 4 | 31 | 0.21 | 0.19 | 0.35 | 0.49 | 0.04 | 0.05 |
| 5 | 29 | 0.22 | 0.20 | 0.31 | 0.43 | 0.03 | 0.04 |
| 6 | 28 | 0.22 | 0.20 | 0.31 | 0.43 | 0.03 | 0.04 |
| 7 | 30 | 0.19 | 0.18 | 0.48 | 0.58 | 0.04 | 0.05 |
| 8 | 34 | 0.19 | 0.18 | 0.48 | 0.58 | 0.04 | 0.05 |
| 9 | 34 | 0.19 | 0.18 | 0.48 | 0.58 | 0.04 | 0.05 |
| Comparative Example | | | | | | | |
| 1 | 36 | 0.18 | 0.11 | 0.58 | 1.80 | 0.05 | 0.15 |
| 2 | 34 | 0.19 | 0.14 | 0.48 | 1.05 | 0.05 | 0.09 |
| 3 | 28 | 0.21 | 0.18 | 0.35 | 0.58 | 0.04 | 0.05 |

| Example No. | Amount of ink required for 10 million letters onto register paper | | Storage Stability | | |
|---|---|---|---|---|---|
| | Low Resolution (g) | Middle Resolution (g) | High Temperature (50° C.) | High Temperature (80° C.) | Low Temperature (−20° C.) |
| Example | | | | | |
| 1 | 10.3 | 38.4 | A | A | A |
| 2 | 13.9 | 48.0 | A | A | A |
| 3 | 13.9 | 48.0 | A | A | A |
| 4 | 11.8 | 48.0 | A | A | A |
| 5 | 10.3 | 38.4 | A | B | A |
| 6 | 10.3 | 38.4 | A | A | A |
| 7 | 13.9 | 48.0 | A | A | A |
| 8 | 13.9 | 48.0 | A | A | A |
| 9 | 13.9 | 48.0 | A | A | A |
| Comparative Example | | | | | |
| 1 | 43.2 | 144.0 | A | B | A |
| 2 | 25.2 | 86.4 | A | A | A |
| 3 | 13.9 | 48.0 | B | C | A |

Note: The dot diameter for low resolution is 0.28 mmφ, and the dot diameter for middle resolution is 0.13 mmφ.

As can be seen in Table 2, the inks of Comparative Examples 1 and 2 comprising Compounds (A) and (B) alone, respectively, gave a small printed dot diameter. This tendency is remarkable particularly on the register paper. In Examples 2 and 3, inks comprising Compounds (A) and Compound (B) in combination were employed. These inks provided a relatively large printed dot diameter (0.18 mmφ) also on the register paper.

This demonstrates that the surfactant comprising either Compound (A) or Compound (B) does not exert desired effects and a surfactant comprising both Compounds (A) and (B) should be added to enhance the penetrating power of the ink.

In Example 5, it can be seen that ink comprising both Compound (A) and Compound (B) and further comprising Compound (C) provides a larger printed dot diameter. However, if the content of Compounds (A), (B) and (C) are increased with aiming at exerting an effect of increasing the printed dot diameter, there is a possibility that the storage stability of the ink is deteriorated. In this instance, it can be seen in Examples 1 and 6 that the addition of a nitrogen-containing heterocyclic compound (auxiliary solvent) such as 2-P inhibits the deterioration of the storage stability. Namely, the addition of Compound (C) provides a larger printed dot diameter and the further addition of the auxiliary solvent allows the increase in the content of Compounds (A), (B) and (C), whereby further enhancing the desirable effects.

In Comparative Example 3, when ink comprising Compounds (A), (B) and (C) and the auxiliary solvent was used, a relatively large dot diameter was obtained. However, it is found that since the addition mole number n of Compound (A) is 9, the storage stability is slightly deteriorated. This is because if the addition moles number n of Compound (A) falls below 10, it reduces the water solubility as well as the storage stability. If the addition mole number n of Compound (A) exceeds 20, it becomes a larger molecule that reduces the penetration of the ink into paper and hence the printed dot diameter tends to be reduced. Therefore, a highly effective range of the addition mole number n of Compound (A) is from 10 to 20.

Comparison of the results of Example 8 and Comparative Example 2 shows that even if the content of Compound (A) is as small as about 0.01% (with the proviso that the content of Compound (A) is not 0%), an effect of enhancing the penetrating power of the ink can be exerted. However, if the content of Compound (A) exceeds 1%, the ink exhibits a reduced water solubility and hence a deteriorated storage stability. Therefore, the content of Compound (A) is preferably from 0.01 to 1%.

When the content of Compound (A) is 1%, Compound (B) is needed in an amount of 1% or more to exert the effect of providing a desired dot diameter. If the content of Compound (B) exceeds 5%, the ink exhibits a reduced water solubility and hence a deteriorated storage stability. Therefore, the content of Compound (B) is preferably from 1 to 5%.

It can be also seen in Example 9 that the addition of Compound (C) in an amount as small as about 0.01% exerts an effect of increasing the printed dot even if the content of Compounds (A) and (B) are minimum. However, if Compound (C) is added in an amount exceeding 0.3%, the ink exhibits a reduced water solubility and hence a deteriorated storage stability. Therefore, the content of Compound (C) is preferably from 0.01 to 0.3%.

Further, when the content of the nitrogen-containing heterocyclic compound was about 20 times by weight or more of the sum of the content of Compound (A) and Compound (C), the ink showed no deterioration of storage stability. Therefore, the content of the nitrogen-containing heterocyclic compound is preferably about 20 times by weight or more of the sum of the content of Compound (A) and Compound (C).

The surface tension of the ink has little effect on the ejectability thereof. However, ink having an unsuitably small surface tension feathers too much on paper and hence deteriorates the printed image quality. On the other hand, ink having an unsuitably large surface tension doesn't penetrate into paper and hence gives too small a printed dot to provide definite letters. Therefore, the surface tension of the ink is preferably from 25 to 35 mN/m.

Figure 1B:
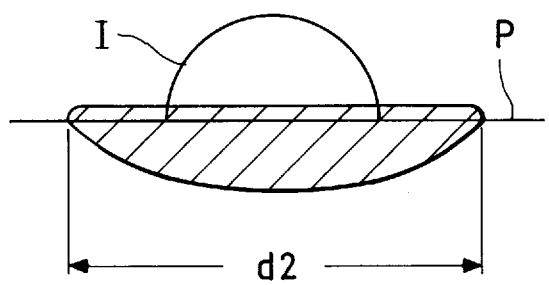
FIG. 1B is a diagram illustrating the action of a water-soluble ink for ink jet type recording according to the present inventing.

Thus, the inks of Examples 1 to 9 comprising a surfactant having a high water solubility and a high lipophilicity in the above specified range exhibit a high penetrating power and a high affinity for paper P. Therefore, the ink droplet I attached to paper P can uniformly penetrate into paper P along the surface thereof to form a large and round dot having a diameter of d2 which does not feather on paper P as shown in FIG. 1.

Further, under various conditions, the ink of the present invention exhibits a good storage stability and hardly foams. Thus, ink having a good quality and a high stability is obtained. Moreover, the ink of the present invention can provide a large printed dot diameter on various kinds of papers. Therefore, the ink of the present invention can print 10 million letters even on a poor quality paper such as register paper, as well as ordinary paper, in an amount of 50 g or less, whereby enabling the reduction of running cost and the reduction of the size and weight of the ink jet cartridge that leads to the miniaturization of the overall structure of the printer.

In the foregoing examples, 1,3-dimethyl-2-imidazolidinone or 2-pyrrolidone was used as the nitrogen-containing heterocyclic compound. However, N-methyl-2-pyrrolidone may also be used to exert the desired effect (of securing a high storage stability).

The foregoing examples have been described with reference to the case where C.I. Direct black 154 is used as a dye. However, the present invention is not limited to this dye. For example, acidic dyes or basic dyes can be selected as necessary so far as they are water-soluble.

The foregoing examples have been described with reference to the case where glycerin is used as a wetting agent. For example, glycols such as ethylene glycol and propylene glycol; polyalkylene glycols such as polyethylene glycol and polypropylene glycol; or lower alkyl ethers of a polyhydric alcohol such as ethylene glycol monomethyl ether and ethylene glycol monoethyl ether can be alternatively used as necessary so far as they are low vapor pressure water-soluble organic solvents.

FIG. 2 is an exploded view illustrating an ink jet type printer according to an embodiment of the present invention employing the foregoing water-soluble ink for ink jet type recording. FIG. 3 is a perspective view of the ink jet type printer of FIG. 2 as viewed from the motor side thereof. As shown in these drawings, the ink jet type printer comprises a printer main body 10 and a paper feed unit 50. The printer main body 10 is provided with an ink jet type cartridge 11 on which a recording head 11a and an ink bag (not shown) are mounted. The ink bag is filled with the foregoing water-soluble ink for ink jet type recording. The ink jet type cartridge 11 is mounted on a carriage 12. The carriage 12 is supported on a pair of guide rods 14 mounted on a frame 13 in such an arrangement that it can move along the axis thereof. A motor 15 which acts as a driving source for driving the carriage 12 may be a DC motor. The motor rotates in a determined direction. The rotation of the motor 15 is transmitted to a gear 16. The gear 16 rotates a gear 17 and a driving wheel 18 engaged therewith to drive a timing belt 19 to run. This rotational movement causes a driven wheel 20 to be rotated so that a gear 21 connected thereto is rotated. The timing belt 19 is provided with a driving pin (not shown) for reciprocating the carriage 12. In this arrangement, when the timing belt 19 is rotationally driven in one direction, the carriage 12 reciprocates.

A gear 22 is engaged with the gear 21 on the driven wheel 20. The gear 22 is mounted on one end of a transmission shaft 23. The transmission shaft 23 is provided with a gear 24 at the other end thereof. When the gear 22 is rotated, a driving power is transmitted to the paper feed unit 50 via the transmission shaft 23 and the gear 24. The printer main body 10 is provided with an encoder 25 for detecting the rotational movement of the motor 15. The encoder 25 is directly connected to the rotational shaft of the motor 15. A control wire 26 for driving the motor 15, a sensor (not shown) and the like and withdrawing a signal therefrom and a control wire 27 for inputting a control signal that drives the recording head 11a are connected to the printer main body 10.

The paper feed unit 50 is provided with a gear train 51 which is engaged with the gear 24 mounted on the other end of the transmission shaft 23 of the printer main body 10. The gear train 51 is connected to a pair of paper feed rotors (not shown). When the ink jet type cartridge 11 is returned to its home position after printing while moving in one direction, the gear train 51 feeds inserted paper forward by one line. The paper feed unit 50 is screwed to a guide surface 13a which is formed by bending the frame 13 of the printer main body 10 upright so that it is fixed to the printer main body 10.

In this arrangement, the ink jet type printer is supplied with a controlling voltage for the motor 15 and sensor via the control wire 26 and a control signal for the recording head 11a mounted on the ink jet type cartridge 11 via the control wire 27. When the motor 15 rotates, the timing belt 19 is driven to run to cause the driving pin to move. The driving pin causes the carriage 12 to move along the guide shaft 14. During this movement, the recording head 11a jets the foregoing water-soluble ink for ink jet type recording onto a register paper, for example, according to control signal to effect printing. When printing is completed by one line, a driving force for feeding paper is transmitted to the paper feed unit 50 via the transmission shaft 23 to cause the paper feed roller of the paper feed unit 50 to be rotated to feed the register paper forward by one line. This operation is repeated until the predetermined lines are printed.

As mentioned above, the water-soluble ink composition for ink jet type recording according to the present invention can provide a good quality feathering-free printed image having a large dot diameter on various kinds of papers, including poor quality paper, as well as ordinary paper, by a small amount. The water-soluble ink composition for ink jet type recording according to the present invention further exhibits a good stability in jetting and a high storage stability.

Accordingly, an ink jet type recording apparatus employing the water-soluble ink according to the present invention can operate at a reduced running cost and the size and weight of an ink jet cartridge can be reduced, whereby enabling to miniature the overall structure of the apparatus.

While the invention has been described in detail and with reference to specific embodiments thereof, it will be apparent to one skilled in the art that various changes and modifications can be made therein without departing from the spirit and scope thereof.

What is claimed is:

1. A water-soluble ink for ink jet type recording comprising water, a water-soluble dye, a wetting agent and a surfactant, wherein said surfactant is a mixture comprising a compound represented by the following formula (A):

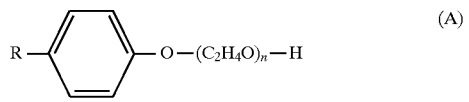

wherein R represents a fluorine atom, a chlorine atom, a bromine atom, an iodine atom, an astatine atom, an octyl group or a nonyl group; and n represents a positive integer, and a compound represented by the following formula (B):

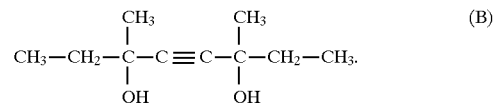

2. The water-soluble ink for ink jet type recording of claim 1, which further comprises a compound represented by the following formula (C):

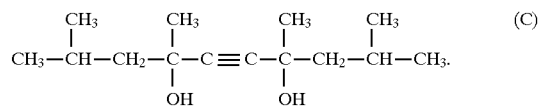

3. The water-soluble ink for ink jet type recording of claim 1 or 2, which additionally comprises a nitrogen-containing heterocyclic compound.

4. The water-soluble ink for ink jet type recording of claim 2, wherein said compound represented by formula (C) is present in an amount of from 0.01 to 0.3% by weight.

5. The water-soluble ink for ink jet type recording of claim 3, wherein said nitrogen-containing heterocyclic compound is selected from the group consisting of 1,3-dimethyl-2-imidazolidinone, N-methyl-2-pyrrolidone and 2-pyrrolidone.

6. The water-soluble ink for ink jet type recording of claim 1, wherein said n in formula (A) is from 10 to 20.

7. The water-soluble ink for ink jet type recording of claim 1, wherein said compounds represented by formulae (A) and (B) are respectively present in amounts of from 0.01 to 1% by weight, and from 1 to 5% by weight.

8. The water-soluble ink for ink jet type recording of claim 3, wherein said nitrogen-containing heterocyclic compound is present in an amount of 20 times or more of a sum of weight percent of said compounds represented by formulae (A) and (C).

9. An ink jet type recording apparatus employing a water-soluble ink, comprising:

a plurality of nozzles disposed at a predetermined nozzle pitch and;

an ink jet head in which the amount of ink to be ejected through a nozzle per ejection is predetermined per dot depending on the nozzle pitch:

wherein said water-soluble ink comprises water, a water-soluble dye, a wetting agent and a surfactant comprising a mixture of at least one compound represented by the following formula (A):

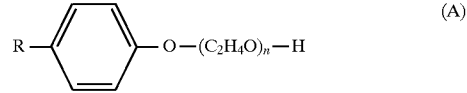

wherein R represents a fluorine atom, a chlorine atom, a bromine atom, an iodine atom, an astatine atom, an octyl group or a nonyl group; and n represents a positive integer, and at least one compound represented by the following formula (B)

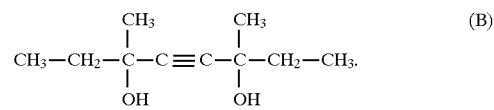

10. The ink jet type recording apparatus of claim 9 comprising an ink jet head having nozzles for ejecting ink droplets and recording a print image at a resolution corresponding to the nozzle pitch of said ink jet head, wherein said ink jet head ejects the ink droplet in a predetermined ejection volume per dot so as to give a dot printed on the recording sheet having a diameter of from 0.28 to 0.4 mm$\phi$ for a low resolution, from 0.13 to 0.18 mm$\phi$ for a medium resolution and from 0.06 to 0.09 mm$\phi$ for a high resolution.

* * * * *